United States Patent
Lee et al.

(10) Patent No.: US 9,357,125 B2
(45) Date of Patent: *May 31, 2016

(54) METHOD AND APPARATUS OF DISPLAYING PORTRAIT ON DISPLAY

(71) Applicant: Samsung Electronics Co., Ltd., Gyeonggi-do (KR)

(72) Inventors: Min-Woo Lee, Gyeonggi-do (KR); Hyun-Hee Park, Seoul (KR); Yong-Deok Kim, Seoul (KR); Jae-Hun Cho, Gyeonggi-do (KR); Yun-Je Oh, Gyeonggi-do (KR); Sung-Dae Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/270,988

(22) Filed: May 6, 2014

(65) Prior Publication Data

US 2014/0240580 A1   Aug. 28, 2014

Related U.S. Application Data

(63) Continuation of application No. 12/641,835, filed on Dec. 18, 2009, now Pat. No. 8,717,480.

(30) Foreign Application Priority Data

Dec. 18, 2008   (KR) .................. 10-2008-0129325

(51) Int. Cl.
*H04N 5/232*   (2006.01)
*H04N 101/00*  (2006.01)

(52) U.S. Cl.
CPC ....... *H04N 5/23219* (2013.01); *H04N 5/23293* (2013.01); *H04N 5/23296* (2013.01); *H04N 2101/00* (2013.01)

(58) Field of Classification Search
CPC ..................... H04N 5/23219; H04N 5/23293
USPC ............... 348/169, 231.2, 231.3, 231.5, 239, 348/240.2, 240.99, 333.01, 333.02, 333.11, 348/333.12; 382/118, 291
See application file for complete search history.

(56) References Cited

U.S. PATENT DOCUMENTS

| | | | | |
|---|---|---|---|---|
| 6,297,846 B1 * | 10/2001 | Edanami | ............... | H04N 7/142 348/14.07 |
| 6,970,181 B1 * | 11/2005 | Fadel | ................... | H04N 7/147 348/14.01 |
| 7,492,406 B2 * | 2/2009 | Park et al. | ............... | 348/333.05 |
| 7,668,369 B2 * | 2/2010 | Yen et al. | ..................... | 382/170 |
| 8,130,243 B2 | 3/2012 | Sudo et al. | | |
| 8,717,480 B2 * | 5/2014 | Lee | ................... | H04N 5/23219 348/333.12 |

(Continued)

FOREIGN PATENT DOCUMENTS

KR   1020060112663   11/2006
KR   1020080012249   2/2008

*Primary Examiner* — Lin Ye
*Assistant Examiner* — Chriss Yoder, III
(74) *Attorney, Agent, or Firm* — The Farrell Law Firm, P.C.

(57) ABSTRACT

A method and an apparatus are provided for displaying a portrait on a display by a portable terminal. It is determined whether an image is a character-photographed image. If the image is the character-photographed image, face detection is executed from the image. A character area in the image is set based on a result of the face detection. The character area is enlarged and displayed in a form of a new window.

18 Claims, 3 Drawing Sheets

(56) References Cited

U.S. PATENT DOCUMENTS

| | | |
|---|---|---|
| 2002/0118964 A1* | 8/2002 | Enomoto .................... 396/60 |
| 2002/0149681 A1* | 10/2002 | Kahn et al. ............... 348/211.99 |
| 2004/0119852 A1* | 6/2004 | Shin ........................ 348/240.2 |
| 2005/0046730 A1 | 3/2005 | Li |
| 2005/0219393 A1 | 10/2005 | Sugimoto |
| 2005/0251015 A1 | 11/2005 | Takikawa et al. |
| 2007/0253699 A1 | 11/2007 | Yen et al. |
| 2007/0297649 A1 | 12/2007 | Nakanishi |
| 2008/0180542 A1 | 7/2008 | Kuniyuki et al. |
| 2009/0079860 A1 | 3/2009 | Li |
| 2009/0141367 A1* | 6/2009 | Guan ........................ 359/676 |
| 2010/0013977 A1* | 1/2010 | Suzuki ..................... 348/333.11 |

* cited by examiner

ABSTRACT

METHOD AND APPARATUS OF DISPLAYING PORTRAIT ON DISPLAY

PRIORITY

This application is a continuation application of U.S. patent application Ser. No. 12/641,835, filed in the U.S. Patent and Trademark Office on Dec. 18, 2009, which claims the priority under 35 U.S.C. §119(a) to an application entitled "Method And Apparatus Of Displaying Portrait On Display" filed in the Korean Intellectual Property Office on Dec. 18, 2008 and assigned Serial No. 10-2008-0129325, the contents of which are incorporated herein by reference.

BACKGROUND OF THE INVENTION

1. Field of the Invention

The present invention relates to a method and apparatus of displaying a portrait on a display of a digital camera or a display of a portable terminal equipped with such a digital camera.

2. Description of the Related Art

In general, digital cameras or portable terminals equipped with digital cameras have displays with a size and resolution that is much smaller than an actual photographed image due to the restrictions as a result of the portability of the digital cameras and portable terminals.

Therefore, in order for a user to photograph an image and then to check a photographed image with the original resolution, it is necessary to magnify the photographed image. However, since conventional displays are not large enough to fully display an original image with a high image-quality (for example, with a high resolution), only a portion of the original image can be confirmed.

When a portrait is photographed with a digital camera, it is necessary to magnify the image displayed on the display of the digital camera in order to check a facial expression or movement of the photographed character from the photographed image, or in order to determine whether the portrait is photographed as desired by the user. Checking a photographed image may be performed by outputting a preview of the image to the user through a display for confirmation. In order to check, from the photographed image, the face of the character or a specific part desired to be checked, it is necessary to magnify the photographed image several times and then to move the region displayed by the display.

Portraits have a characteristic in that after a photographing a character, it may be difficult to photograph the character again with the same facial expression or movement. Therefore, in order to check a facial expression or an interested part of a character from a photographed image after the character is photographed, there is an inconvenience in the conventional photographing and display methods, in that for each photograph, it may be necessary to magnify the photographed image several times, and to move the region displayed by the display to the face of the character or the interested part desired to be checked.

Consequently, what is needed is a method for simply and quickly checking a facial expression or movement of a character when photographing a portrait.

SUMMARY OF THE INVENTION

Accordingly, the present invention has been made to solve the above-mentioned problems occurring in the prior art, and the present invention provides a method and apparatus for displaying so that a feature of a photographed portrait can be easily checked from a digital camera or a portable terminal equipped with such a digital camera.

In accordance with an aspect of the present invention, a method of displaying a portrait on a display by a portable terminal is provided. It is determined whether an image is a character-photographed image. If the image is the character-photographed image, face detection is executed from the image. A character area in the image is set based on a result of the face detection. The character area is enlarged and displayed in a form of a new window.

In accordance with another aspect of the present invention, a portable terminal is provided for displaying a portrait on a display. The portable terminal includes a character image determining unit for determining whether an image is a character-photographed image. The portable terminal also includes a face detecting unit for executing face detection from the image if the image is the character-photographed image. The portable terminal additionally includes a character area setting unit for setting a character area based on a result of the face detection. The portable terminal further includes a scaler for enlarging the character area, and a display for displaying enlarged character area in a form of a new window.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Figure 1:
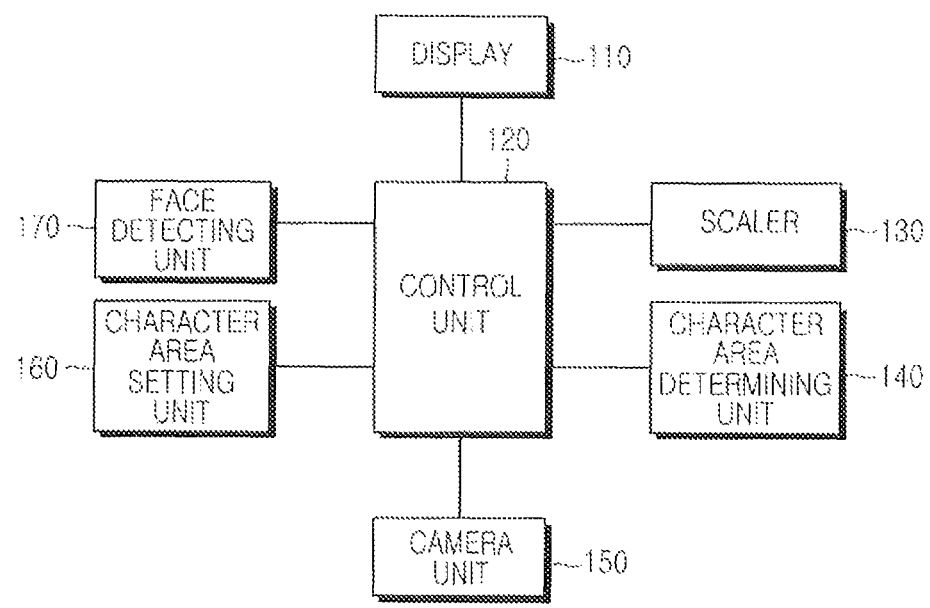
FIG. 1 is a block diagram of a portrait displaying apparatus according to an embodiment of the present invention.

Hereinafter, embodiments of the present invention will be described with reference to the accompanying drawings. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

The present invention eliminates disturbances that result in magnification of a photographed image many times followed by a check of a part of the image desired to be checked, when the part of the image is displayed in a large scale on a display at the time the check of a photographed character from a portrait. Such disturbances result from the small display size of a display device compared to an original size of a photographed image.

Therefore, the present invention provides a portrait displaying method and apparatus that allows the quality of a portrait to be easily and quickly checked from a digital camera or a portable terminal equipped with such a digital camera.

One embodiment of the present invention includes a method of displaying a portrait, such that the method includes confirming whether a photographed image is a portrait by using camera setting of the photographed image (numerical aperture and photographing mode); detecting a face by using a face detecting technique whether the photographed image is a portrait; setting a character area in the photographed image by using the face detection result; and magnifying and displaying the set character area through the entirety of the display or magnifying and displaying the set character area with a new window at a certain region on the display where no character is positioned.

Below, the present invention will be described in more detail with reference to accompanying drawings.

FIG. 1 is a block diagram of a portrait displaying apparatus according to an embodiment of the present invention. The portrait displaying apparatus includes a camera unit 150, a character image determining unit 140, a face detecting unit 170, a scaler unit 130, a character area setting unit 160, a display 110, and a control unit 120.

The camera unit 150 photographs an object with an image sensor.

The character image determining unit 140 determines whether a photographed image is a portrait, wherein the determination may include using Exchangeable Image File Format (Exif) information of the photographed image, or photographing mode information of the camera.

Exif is a file format for adding detailed information corresponding to an image by a digital camera, for example. Exif includes date and time information, camera setting information, such as shutter speed, numerical aperture, exposing time, photographed territory information, descriptions, copyright related information, etc.

The character image determining unit 140 checks numerical aperture values from the Exif of a photograph, and if the numerical aperture does not have a specific value, the character image determining unit determines that the corresponding photograph is a portrait. In general, a portrait is photographed by setting the numerical aperture relatively lower (by opening the iris wider) than an aperture used for photographing a landscape, so as to limit the focusing range, since a specific object (such as a human subject) may be more emphasized in such a portrait as compared to a landscape photograph or a group photograph. Therefore, as according to an embodiment, for example, the reference value of numerical aperture may be set within the range of f5.6 to f8.0, and if the numerical aperture of a photographed image is less than or equal to the reference value, the photographed image may be determined as a portrait. In addition, if a camera or a portable terminal equipped with such a camera is capable of being set in any photographing mode, it is determined whether the camera is set as a character photographing mode. If it is determined that the camera is set as the character photographing mode, the photographed image may be determined as a portrait.

When the character image determining unit 140 determines that the photographed image is a portrait, the face detecting unit 170 performs face detection on the photographed image. The face detection may be performed by using an existing face detection method, such as a face detection technique using pattern recognition. If no face is detected as a result of performing the face detection on the image determined as a portrait, it is determined that the initial determination of the character image determining unit 140 is incorrect, and the photographed image is rendered to be output to the display 110 without magnification.

The character area setting unit 160 sets a character area within the photographed image on the basis of the face detection result of the face detecting unit 170. At this time, the character area setting unit 160 finds a character's position in consideration of the position and size of the detected face and then sets the character area in the photographed image. In such a case, the character area may be set in a rectangular form wherein the detected face may be positioned at the center of the rectangular form or at the center of an upper part of the rectangular form. In addition, in order to magnify the character area to completely fill the display, the ratio of width to length of the character area may be set to be equal to that the ratio of width to length of the display.

In addition, it is possible to set the character area in such a manner that the detected face is positioned at the center of the top of the character area, in consideration of the size of the detected face, so that the detected face and the body of the character can be included within the character area. For example, the position (i.e., coordinates) of the character area on the abscissa may be set in such a manner that the detected face is centrally positioned, the horizontal length of the character area may be set to be three (3) times of the width of the detected face, the position of the character area on the ordinate may be set in such a manner that the detected face is positioned at the top of the character area, and the height of the character area may be set to be seven (7) times of the vertical length of the detected face. The values for determining the horizontal and vertical lengths of the character area (i.e., three times and seven times in the present example), are not exclusive but may be replaced with other values in accordance with the present invention.

Alternatively, it is possible to set the character area to only enclose a face. In such a case, the character area is set in such a manner that only a detected face is enclosed in the character area.

The character area setting unit 160 also determines a magnification ratio for displaying the character area in consideration of the set character area and the resolution of the display 110. In other words, the magnification ratio for allowing the character part to be magnified and displayed in a size suitable for the user to see the character area is calculated in consideration of the size of the set character area and the resolution of the display. In such a case, a proper magnification ratio is calculated, depending on whether the character area is displayed to fill the entirety of the display 110 or whether the character area is displayed at a specific part on the photographed image in the form of a new window.

The scaler unit 130 magnifies the character area set by the character area setting unit 160.

The display unit 110 displays a photographed image and various image information items. In particular, according to an embodiment of the present invention, the display 110 may display the character area set by the character area setting unit 160 to fill the entirety of the screen of the display 110, or the display 110 may magnify and display the character area set by the character area setting unit 160 at a specific portion of the photographed image in the form of a new window.

The control unit 120 controls of the general operations of individual components of the portrait display apparatus.

Figure 2:
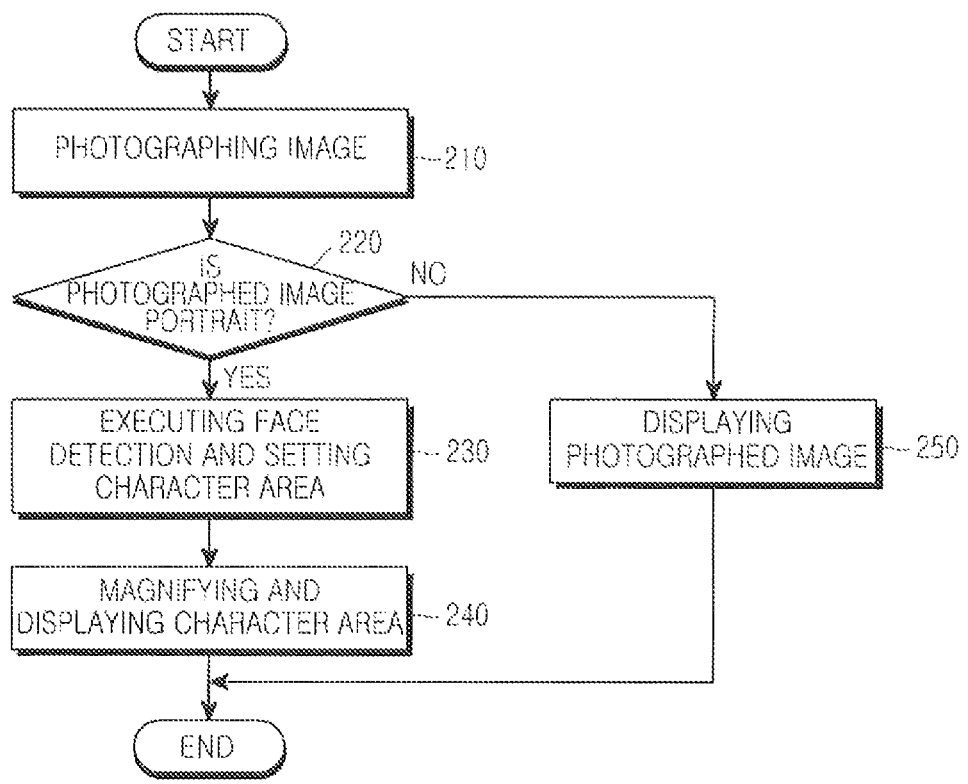
FIG. 2 is a flow chart of a portrait displaying method according to an embodiment of the present invention.

FIG. 2 is a flowchart of a portrait display method according to an embodiment of the present invention.

In step 210, the camera unit 150 photographs an image, and in step 220, the character image determining unit 140 determines whether the photographed image is a portrait. Such determination may be executed by confirming numerical aperture through Exif information of the photographed image, and comparing the confirmed numerical aperture with the preset reference numerical aperture, thereby determining whether the photographed image is a portrait. Alternatively, if the photographing mode at the time of photographing is the portrait photographing mode, the photographed image may be determined as a portrait. If the confirmed numerical aperture is less than the preset reference numerical aperture, the photographed image is determined as a portrait. If it is determined that the photographed image is not a portrait, the process proceeds to step 250 in which the photographed image is displayed without magnification.

If it is determined that the photographed image is a portrait in step 220, the process proceeds to step 230, in which step face detection from the photographed image is executed by the face detection unit 170, and a character area is set in the photographed image by the character area setting unit 160 according to the result of face detection.

In step 240, the character area set as described above is magnified and displayed by the scaler 130. The character area may be magnified and displayed to fill the entire screen of the display, or magnified and displayed in the form of a new window. The new window may be displayed over a specific part of the photographed image.

Figure 3A:
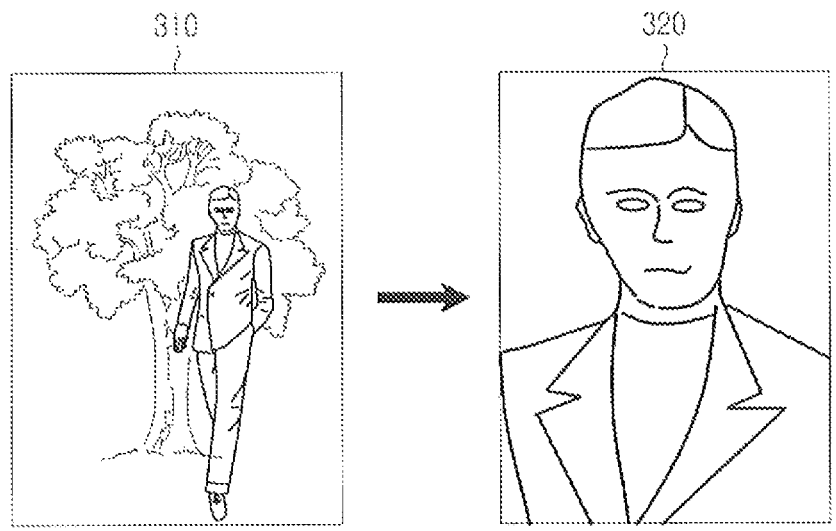
FIGS. 3A and 3B are illustrations of portraits displayed on a screen of a display according to an embodiment of the present invention.
Figure 3B:
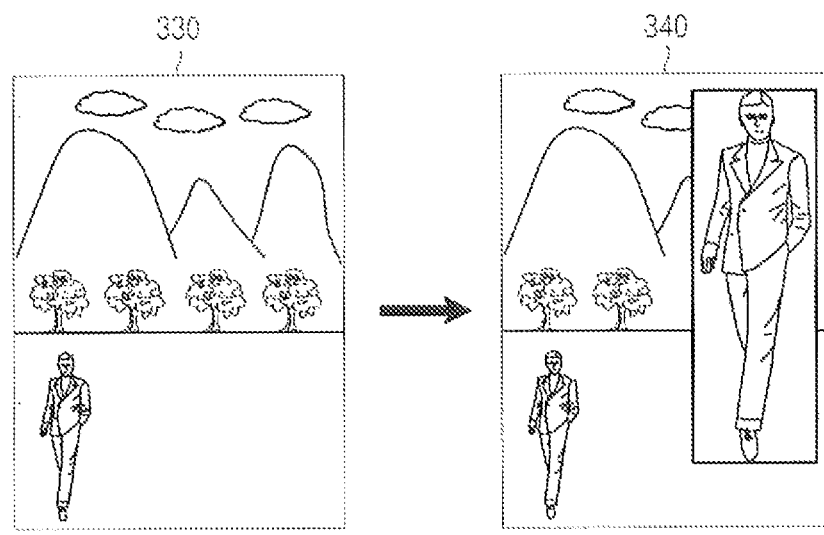

FIGS. 3A and 3B are illustrations of portraits displayed on a screen of a display according to an embodiment of the present invention.

FIG. 3A shows an example of a picture 320 displayed to fill the entirety of the display 110, wherein a character area is set from an initially photographed image 310, and the set character area is displayed as shown in image 320. In FIG. 3A, the ratio of width to length of the character area is set to be equal to that of the display.

FIG. 3B shows an example of a picture 340 magnified and displayed at a specific part on a photographed image 330 in the form of a new window, wherein a character area is set from the photographed image 330 and the character area is magnified and displayed as shown in 340.

In the example of FIG. 3B, the character area is set in such a manner that the detected face is positioned at the center of the top of the character area so as to render the entire character to be enclosed within the character area. In this example, the horizontal length of the character area is set to be three (3) times the width of the detected face, and the vertical length of the character area is set to be seven (7) times of the vertical length of the detected face. In addition, when the face area is displayed in the form of a new window, the new window is adapted to be displayed at a position where it does not overlap to the part of the original image where the existing character is positioned.

In FIG. 3A, the upper half of a character's body including the face is set as the character area, and in FIG. 3B, the character area is set to enclose the entire body of the character. However, it is also possible to set the character area to enclose only the face of the character, or to set the character area in such a manner that the face is centrally positioned in the character area. These regions are provided as an example, but other regions of a photographed subject may also be set as a character area in accordance with the present invention.

The construction and operation of the method and apparatus for displaying a portrait on a display according to an embodiment of the present invention may be implemented as described above. Although it has been described above that the present invention is workable in a camera or a portable terminal equipped with such a camera, it is also possible to display a portrait on a portable terminal that is not equipped with a camera by using image data stored in the portable terminal.

According to the present invention, it is possible to easily and quickly check the quality of a photographed portrait even from a relatively small-sized display in a digital camera or a portable terminal equipped with such a digital camera.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for displaying a portrait on a display by a portable terminal, comprising the steps of:
   determining a numerical aperture included in Exchangeable Image File Format (Exif) information of a photographed image is less than a reference numerical aperture;
   if the numerical aperture is less than the reference numerical aperture, determining the photographed image as a character-photographed image;
   executing face detection from the character-photographed image;
   setting a character area in a rectangular form in the character-photographed image based on a result of the face detection; and
   enlarging and displaying the character area in a form of a new window.

2. The method as claimed in claim 1, further comprising:
   if a photographing mode of a camera, at a time of photographing the photographed image, is a character photographing mode, determining the photographed image as the character-photographed image.

3. The method as claimed in claim 1, wherein the character area is set in the rectangular form comprising a detected face.

4. The method as claimed in claim 1, wherein the character area is set in such a manner that a detected face is positioned at a center of the character area.

5. The method as claimed in claim 1, wherein the character area comprises an entire body of a character corresponding to a detected face.

6. The method as claimed in claim 1, wherein setting the character area in the character-photographed image based on the result of the face detection comprises:
   setting a horizontal length of the character area to a predetermined multiple of a horizontal width of a detected face;
   setting a vertical length of the character area to a predetermined multiple of a vertical length of the detected face;
   setting a position of abscissa of the character area in such a manner that the detected face is centrally positioned with reference to the position of abscissa; and
   setting a position of ordinate of the character area in such a manner that the detected face is positioned at the top of the position of ordinate.

7. The method as claimed in claim 1, wherein enlarging and displaying the character area in the form of the new window comprises:
   enlarging the character area in such a manner that the character area occupies an entire screen.

8. The method as claimed in claim 1, wherein enlarging and displaying the character area in the form of the new window comprises:
   displaying the character-photographed image in such a manner that the character-photographed image occupies an entire screen; and enlarging and additionally displaying the character area in the form of the new window at a specific part of the screen where the character-photographed image is displayed.

9. The method as claimed in claim 1, wherein the new window is not overlapped with the character area of the character-photographed image.

10. A portable terminal for displaying a portrait on a display, comprising:
a character image determining unit configured to:
determine a numerical aperture included in Exchangeable Image File Format (Exif) information of a photographed image is less than a reference numerical aperture, and
if the numerical aperture is less than the reference numerical aperture, determine the photographed image as a character-photographed image;
a face detecting unit configured to execute face detection from the character-photographed image;
a character area setting unit configured to set a character area in a rectangular form in the character-photographed image based on a result of the face detection;
a scaler configured to enlarge the character area; and
a display configured to display the enlarged character area in a form of a new window.

11. The portable terminal as claimed in claim 10, wherein the character image determining unit is further configured to determine the photographed image as the character-photographed image if a photographing mode of a camera, at a time of photographing the photographed image, is a character photographing mode.

12. The portable terminal as claimed in claim 10, wherein the character area setting unit sets the character area in the rectangular form comprising a detected face.

13. The portable terminal as claimed in claim 10, wherein the character area setting unit sets the character area in such a manner that a detected face is positioned at a center of the character area.

14. The portable terminal as claimed in claim 10, wherein the character area comprises an entire body of a character corresponding to a detected face.

15. The portable terminal as claimed in claim 14, wherein the new window is not overlapped with the character area of the character-photographed image.

16. The portable terminal as claimed in claim 10, wherein the character area setting unit sets a horizontal length of the character area to a predetermined multiple of a horizontal width of a detected face, sets a vertical length of the character area to a predetermined multiple of a vertical length of the detected face, sets a position of abscissa of the character area in such a manner that the detected face is centrally positioned with reference to the position of abscissa, and sets a position of ordinate of the character area in such a manner that the detected face is positioned at the top of the position of ordinate.

17. The portable terminal as claimed in claim 10, wherein the display enlarges and displays the character area in such a manner that the character area occupies an entire screen.

18. The portable terminal as claimed in claim 10, wherein the display displays the character-photographed image in such a manner that the character-photographed image occupies an entire screen, and enlarges and additionally displays the character area in the form of the new window at a specific part of the screen where the character-photographed image is displayed.

* * * * *